US011474837B2

(12) United States Patent
Han (10) Patent No.: US 11,474,837 B2
(45) Date of Patent: Oct. 18, 2022

(54) METHOD AND APPARATUS FOR EFFICIENT PROGRAMMING OF ELECTRONIC PAYMENT PROCESSING

(71) Applicant: Advanced New Technologies Co., Ltd., George Town (KY)

(72) Inventor: Xiao Han, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/178,756

(22) Filed: Feb. 18, 2021

(65) Prior Publication Data

US 2021/0263750 A1 Aug. 26, 2021

Related U.S. Application Data

(63) Continuation-in-part of application No. 16/870,746, filed on May 8, 2020, now abandoned, which is a
(Continued)

(30) Foreign Application Priority Data

Apr. 9, 2018 (CN) .......................... 201810309884.7

(51) Int. Cl.
*G06F 9/448* (2018.01)
*G07G 1/12* (2006.01)
*G06F 9/30* (2018.01)

(52) U.S. Cl.
CPC .......... *G06F 9/4498* (2018.02); *G06F 9/3004* (2013.01); *G07G 1/12* (2013.01)

(58) Field of Classification Search
USPC .......................... 717/106, 121, 122, 137, 140
See application file for complete search history.

(56) References Cited

U.S. PATENT DOCUMENTS 10,915,450 B2 * 2/2021 Brown .................. G06F 9/4498
2006/0235548 A1 * 10/2006 Gaudette .................. G06F 8/34
700/83
(Continued)

FOREIGN PATENT DOCUMENTS

CN 1987781 A 6/2007
CN 201307311 Y 9/2009
(Continued)

OTHER PUBLICATIONS

"VCL Basics", Varnish Finite State Machine—Subroutines, downloaded from https://book.varnish-software.com/4.0/chapters/VCL_Basics.html and attached as PDF file; PDF file providing Wayback Machine output also provided for date purposes. (Year: 2016).*
(Continued)

*Primary Examiner* — James D Nigh
*Assistant Examiner* — Margaret M Neubig
(74) *Attorney, Agent, or Firm* — Seed IP Law Group LLP (57) ABSTRACT

The present disclosure relates to efficient programming and configuring of electronic payment process. An example method includes receiving programming language-based descriptions each describing a distinct functional operation usable to implement the electronic payment process, compiling each programming language-based description into a distinct computer-executable code segment that corresponds to a state of a finite state machine. The method also includes determining transition relationships between states of the finite state machine based on the logic flow of steps of the electronic payment process, generating a state transition table for storing in a cache of a computer-based electronic payment system implementing the finite state machine, and configuring the finite state machine by retrieving the state transition table from the cache at runtime.

20 Claims, 3 Drawing Sheets

Related U.S. Application Data continuation of application No. PCT/CN2019/074095, filed on Jan. 31, 2019.

(56) References Cited

U.S. PATENT DOCUMENTS

| | | | |
|---|---|---|---|
| 2007/0266394 A1 | 11/2007 | Odent et al. | |
| 2011/0093694 A1* | 4/2011 | Nedbal | H04L 63/1416 709/224 |
| 2013/0041707 A1 | 2/2013 | Bose et al. | |
| 2015/0019916 A1 | 1/2015 | Kane | |
| 2015/0161025 A1 | 6/2015 | Baset et al. | |
| 2015/0169303 A1* | 6/2015 | Zhao | G06F 8/443 717/160 |
| 2017/0351492 A1* | 12/2017 | Szpak | G06F 9/44505 |

FOREIGN PATENT DOCUMENTS

| | | |
|---|---|---|
| CN | 101873334 A | 10/2010 |
| CN | 102467414 A | 5/2012 |
| CN | 103745540 A | 4/2014 |
| CN | 102103497 B | 3/2015 |
| CN | 107315591 A | 11/2017 |
| CN | 107357592 A | 11/2017 |
| CN | 107864193 A | 3/2018 |
| CN | 108764864 A | 6/2018 |
| TW | I222588 B | 10/2004 |
| WO | WO-2018078584 A1 * | 5/2018 ............. A63C 5/075 |
| WO | WO2018078584 A1 | 5/2018 |

OTHER PUBLICATIONS

"Stateflow® and Stateflow® Coder™ 7 User's Guide", hereafter "Stateflow Guide", (dated Mar. 2009 and downloaded from http://physics.fme.vutbr.cz/~rudolf/Download/Matlab/Literature/sf_ug.pdf , excerpts attached as PDF file), 16. (Year: 2009).*

"VCL Basics", Varnish Finite State Machine—Subroutines, downloaded from https://book.varnish-software.com/4.0/chapters/VCL_Basics.html and previously attached as PDF file; PDF file providing Wayback Machine output also provided for date purposes. (Year: 2016).*

"Stateflow® and Stateflow® Coder™ 7 User's Guide", hereafter "Stateflow Guide", (dated Mar. 2009 and downloaded from http://physics.fme.vutbr.cz/~rudolf/Download/Matlab/Literature/sf_ug.pdf , excerpts previously attached as PDF file), 16. (Year: 2009).*

"What Is an Atomic Subchart?", (downloaded from https://web.archive.org/web/20170607205054/https://www.mathworks.com/help/stateflow/ug/what-is-an-atomic-subchart.html for date support and attached as a PDF file (Year: 2017).*

"Basics of Automata Theory," dated May 2004, downloaded from https://cs.stanford.edu/people/eroberts/courses/soco/projects/2004-05/automata-theory/basics.html and attached as a PDF file. (Year: 2004).

* cited by examiner

METHOD AND APPARATUS FOR EFFICIENT PROGRAMMING OF ELECTRONIC PAYMENT PROCESSING

The present specification relates to the field of computing technology, and in particular, to methods and tools for computer programming related to electronic payment.

BACKGROUND

Computer programming is an important aspect of computer science and technology. Computer program includes the process of designing and building executable computer programs to accomplish a specific computing result or to perform a specific task. The source code of a program is typically written in one or more languages that are intelligible to programmers, rather than machine code, which is directly executed by one or more processors. Proficient programming typically requires expertise in several different subjects, including knowledge of the application domain, specialized algorithms, and formal logic. There is a need for methods and tools to facilitate more efficient computer programming in general or in specialized areas.

Figure 1:
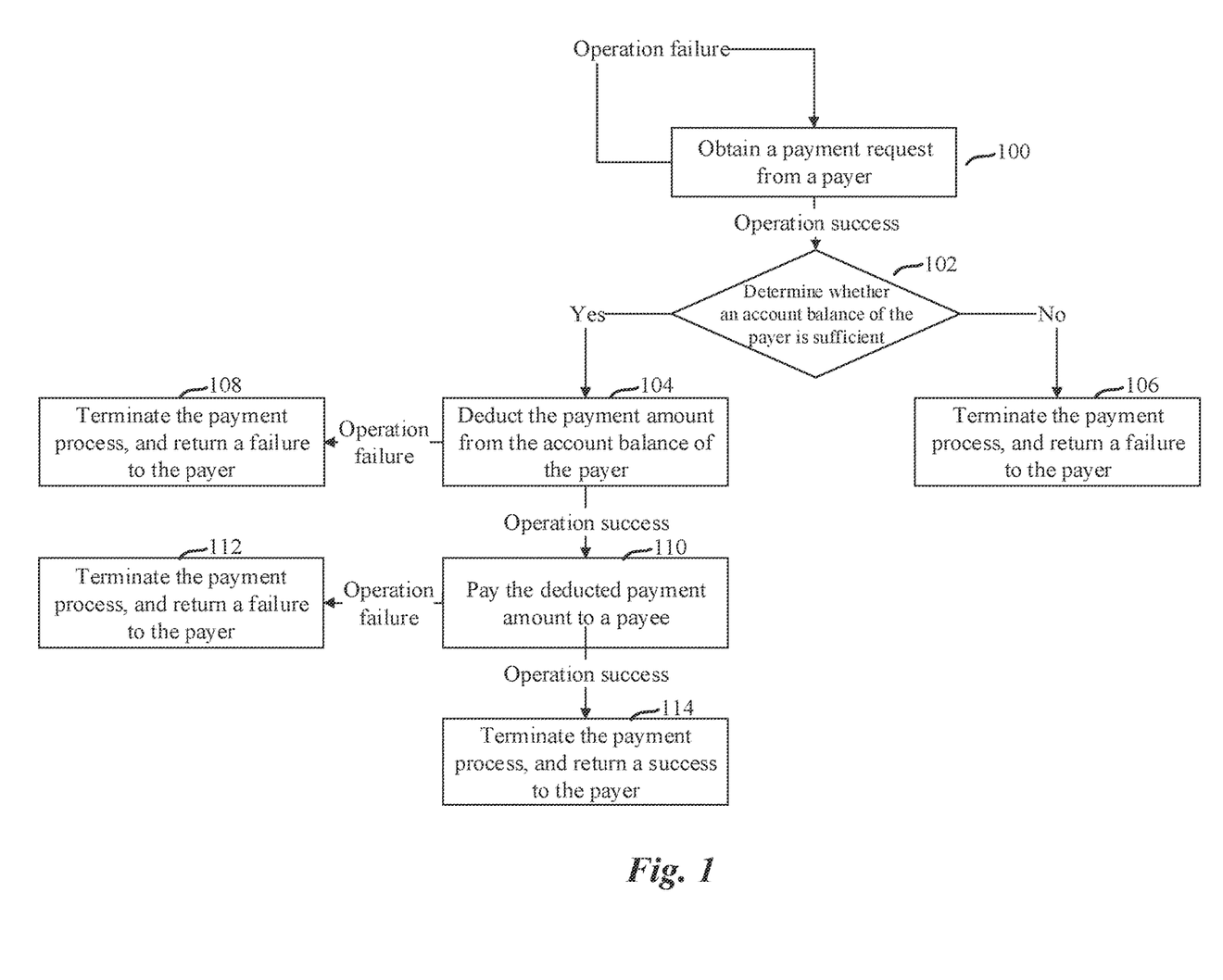
FIG. 1 is a schematic diagram illustrating a payment process.

Electronic payment processing has become a specialized area where tools to facilitate more efficient programming are desired. As an example, FIG. 1 illustrates a typical payment process. In FIG. 1, the payment process includes eight steps S100 to S114, where steps S106, S108, and S112 are actually identical steps. When the electronic payment system determines that a payment abnormality has occurred (for example, the account balance of the payer is insufficient, the deduction has failed, or the payment has failed), the payment process is terminated, and a failure result is returned to the payer (for example, step S106, S108, or S112 is performed).

The payment process is pre-configured by technical staff by means of programming, and that execution of the payment process by the electronic payment system is essentially to execute code logic that corresponds to the payment process sequentially from beginning to end. Therefore, even if the operations of steps S106, S108, and S112 shown in FIG. 1 are the same, the technical staff needs to write code for each of the above three steps, that is, to write three code segments. Therefore, programming the entire payment process from beginning to end can be a tedious, repetitive process that suffers from inefficiencies.

BRIEF DESCRIPTION OF DRAWINGS

To describe the technical solutions in the implementations of the present specification or in the existing technology more clearly, the following outlines the accompanying drawings for illustrating such technical solutions. Clearly, the accompanying drawings outlined below are some implementations of the present specification and a person skilled in the art can derive other drawings or implementations from such accompanying drawings without creative efforts.

DESCRIPTION OF IMPLEMENTATIONS

In the implementations of the present specification, methods and systems for efficiently programming a payment process is provided. In some embodiments, the presently disclosed technology facilitates efficient programming of the payment process by configuring and implementing a corresponding finite state machine. Each distinct functional operation included in the payment process can be programmed separately and mapped to a different state in the finite state machine, so that a plurality of steps of the same functional operation included in the payment process may correspond to a same state, and a user or staff only need to write and compile a single code segment for the state, thereby eliminating the redundancy and repetitiveness of traditional programming for a payment process. The different states of the finite machine can be configured to transition between one another based on a state transition table that is separately configurable and retrieved at runtime, which improves efficiency and flexibility of configuring different payment processes. In some embodiments, different payment processes have at least some functional operations in common, and therefore code segment(s) programmed and/or compiled for one finite state machine (e.g., to implement a first payment process) can be shared or reused for other finite state machine(s) (e.g., to modify the first payment process or to implement a second payment process). This way, the efficiency for programming electronic payment processes is further improved.

In some embodiments, an electronic payment process includes a logic flow of steps each corresponding to a functional operation, and multiple steps of the logic flow correspond to a same functional operation. Illustratively, the logic flow can be represented as a flow chart, where each block corresponds to a step of the payment process. The blocks are connected to one another (e.g., with directed connections) to form a type of directed graph, and certain blocks can also include a connection directed to itself (e.g., a directed loop).

A method for programming and configuring the electronic payment process includes receiving a plurality of programming language-based descriptions each describing a distinct functional operation of a plurality of functional operations usable to implement the electronic payment process, and compiling each of the plurality of programming language-based description into a distinct computer-executable code segment of a plurality of code segments. Here, the plurality of code segments correspond to a plurality of states of a finite state machine. In some embodiments, programming language-based descriptions can be source codes written in accordance with applicable programming language. The programming language-based descriptions for different functional operations can be based on the same or different programming languages. The code segments after compiling include object code or machine code for execution by hardware processor(s). Alternatively or in addition, the code segments after compiling can include byte code to be loaded by virtual machine(s) for further, just-in-time compiling and execution on computing device(s).

The method also includes determining a plurality of transition relationships between states of the plurality of states based on the logic flow of steps of the electronic payment process, receiving indication of conditions for transitioning between the states, wherein the conditions include one or more results from executing the computer-executable code segment that corresponds to one of the states, and generating a state transition table based on the plurality of states, the transition relationship between the states, and the conditions for transitioning between the states.

The method further includes storing the state transition table in a cache of a computer-based electronic payment system that implements the finite state machine, configuring the finite state machine of the computer-based electronic payment system by retrieving the state transition table from the cache at a runtime of the computer-based electronic payment system, and executing the electronic payment process through the finite state machine by selectively and dynamically executing one or more code segments of the plurality of code segments based on the state transition table.

To make a person skilled in the art better understand the technical solutions in the present specification, the following clearly describes the technical solutions in the implementations of the present specification with reference to the accompanying drawings in the implementations of the present specification. Clearly, the described implementations are merely some but not all of the implementations of the present specification. Based on the implementations of the present specification, a person skilled in the art can obtain other implementations without creative efforts, which all fall within the scope of the present specification.

The following describes in detail the implementations of the present specification.

Figure 2:
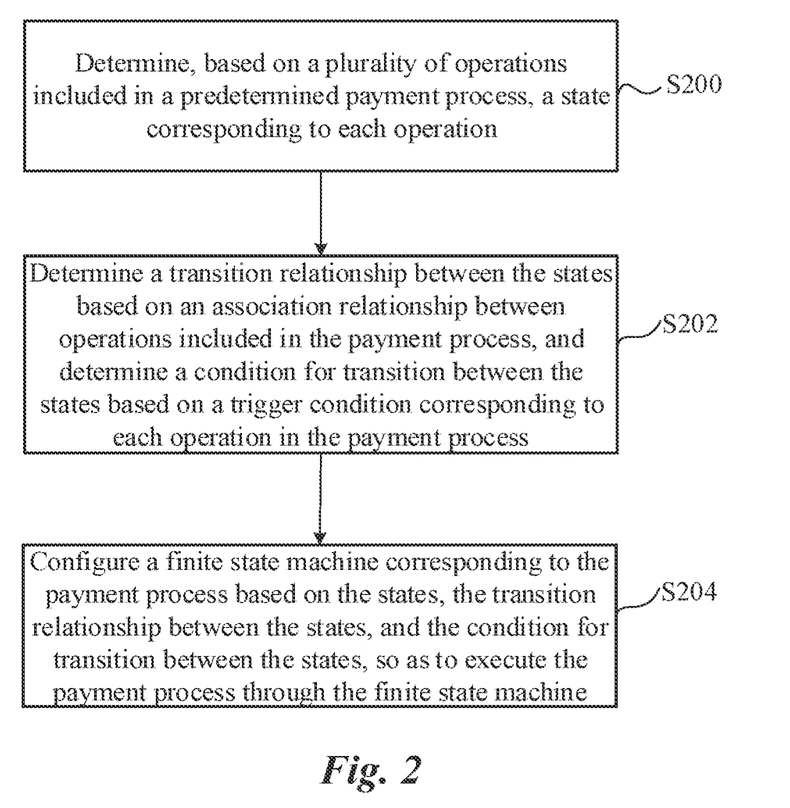
FIG. 2 is a flowchart illustrating a method for configuring a payment process, according to an implementation of the present specification.

FIG. 2 is a flowchart illustrating a method for configuring a payment process, according to an implementation of the present specification. The method includes the following steps:

S200: Determine, based on a plurality of functional operations included in a payment process, a state corresponding to each functional operation.

Generally, the electronic payment system is triggered by a payment request sent from a payer to execute a payment process. It is worthwhile to note that there can be a plurality of payment processes depending on different service scenarios. For example, in the case of payment with medical insurance, the payment process can be a process of paying medical expenses using one or more of a bank card and a medical insurance card.

The payment process includes a plurality of steps, and each step corresponds to a functional operation. When performing a step, the electronic payment system actually performs the functional operation corresponding to the step. For example, the functional operation corresponding to step S102 shown in FIG. 1 is to "determine whether the account balance of the payer is sufficient." Clearly, the payment process can include a plurality of steps that have the same functional operation, (for example, steps S106, S108, and S112 shown in FIG. 1), but the functional operations included in the payment process are different from one another.

In this implementation of the present specification, each functional operation included in the payment process, e.g., predetermined or dynamically determined, can be represented as a state. For each functional operation, the state corresponding to the functional operation is the state of the payment service when the electronic payment system performs the functional operation. In the description herein, a predetermined payment process is used as an illustrative example, which does not limit the scope of the specification. The techniques are also applicable in the scenario that a payment process is dynamically determined and dynamically updated.

S202: Determine a transition relationship between the states based on an association relationship between functional operations included in the payment process, and determine a condition for transition between the states based on a trigger condition corresponding to each functional operation in the payment process.

There is usually an association between the functional operations included in the payment process. It is worthwhile to note that the association between two functional operations means that after one of the functional operations is performed, it is possible that the other functional operation is performed immediately after the functional operation. For two functional operations with an association relationship, the functional operation that is performed previously can be referred to as a "first operation," and the operation that is performed subsequently can be referred to as a "second operation." The association relationships can be extracted or derived from the logical flow (e.g., represented as a flow chart) of the payment process, a same first operation can be associated with different second operations in different parts of the logical flow, and different first operations can be associated with a same second operation in different parts of the logical flow.

For example, there is an association relationship between the operation corresponding to step S102 shown in FIG. 1 and the operation corresponding to step S104. The operation corresponding to step S102 is a first operation, and the operation corresponding to step S104 is a second operation. It is also worthwhile to note that sometimes a functional operation has an association with itself, for example, step S100 in FIG. 1.

Clearly, if each functional operation included in the payment process is represented as a state, the process of performing the functional operations can be represented as a process of transitioning between the states; that is, a transition between every two functional operations with an association relationship can be viewed/represented as a transition between the states corresponding to the two functional operations. Therefore, the transition relationship between the states can be determined based on the association relationship between the functional operations. There is usually a transition relationship between the states corresponding to two functional operations having an association relationship therebetween.

Further, the condition for transition between the states can be determined based on the trigger condition corresponding to each functional operation in the payment process. Specifically, for each functional operation, the trigger condition corresponding to the operation is generally that if a first operation (e.g., the immediate preceding operation) associated with the operation has obtained a specific execution result, then the operation is a second operation (e.g., the operation to be performed next). For example, in FIG. 1, for an operation corresponding to step S102 and an operation corresponding to step S104 that have an association relationship, an execution result "yes" of the operation corresponding to step S102 is a trigger condition of the operation corresponding to step S104. In some embodiments, the condition for triggering a functional operation can include a combination of results from multiple preceding operations.

S204: Configure a finite state machine corresponding to the payment process based on the states, the transition relationship between the states, and the condition for transition between the states, so as to execute the payment process through the finite state machine.

In steps S200 to S202, each state of a finite state machine, a transition relationship between the states, and a condition for transition between the states are obtained. The finite state machine can be configured based on the states of the finite state machine, the transition relationship between the states, and the condition for transition between the states and can be used for executing the payment process.

Further, a state transition table corresponding to the finite state machine can be generated based on the states, the transition relationship between the states, and the condition for transition between the states, for the electronic payment system to query the state transition table in executing the payment process. Table 1 shows a state transition table according to implementations of the present specification.

TABLE 1

| Current state | Transition condition | State after transition |
|---|---|---|
| State 1 (operation A) | Operation A succeeds. | State 2 (operation B) |
| State 2 (operation B) | Operation B fails. | State 3 (operation C) |
| State 1 (operation A) | Operation A fails. | State 4 (operation D) |
| ... | ... | ... |

It is worthwhile to note that the state transition table can be written to the configuration file of the electronic payment system, for the electronic payment system to retrieve the state transition table from the configuration file of the electronic payment system at a startup; or the state transition table can be written to the cache of the electronic payment system, for the electronic payment system to retrieve the state transition table from the cache of the electronic payment system at a runtime. Of course, the state transition table can be written to both the configuration file and the cache.

According to the method for configuring a payment process shown in FIG. 2, a state corresponding to each functional operation is determined based on each functional operation included in a predetermined payment process, a transition relationship between the states is determined based on an association relationship between functional operations included in the payment process, and a condition for transition between the states is determined based on a trigger condition corresponding to each functional operation in the payment process. Thus, the payment process can be represented as a finite state machine, and the payment process can be executed using the finite state machine. In the implementations of the present specification, each functional operation included in the payment process is represented as a state in the finite state machine. Even if a payment process includes a plurality of steps that have a same functional operation, which actually correspond to a same state, the technical staff only needs to write and/or program code segment for the state, which improves the efficiency of programming and configuring the payment process.

In addition, for a more complex payment process (for example, the process includes a large number of steps, or each step can be transitioned to a large number of other steps), abstracting the payment process as a finite state machine also helps simplify the programming work of a technical staff. The technical staff abstracts each functional operation included in the payment process into a state, and only needs to configure the condition for transition between the states (that is, configure the state transition table) because all the code segments of functional operations have been programmed and/or compiled ahead of time. Different state transition tables can be configured and generated to correspond to different payment processes, and a payment process can be modified by making changes to its corresponding state transition table. This mechanism improves both scalability and flexibility for programming and configuration payment processes.

Figure 3:
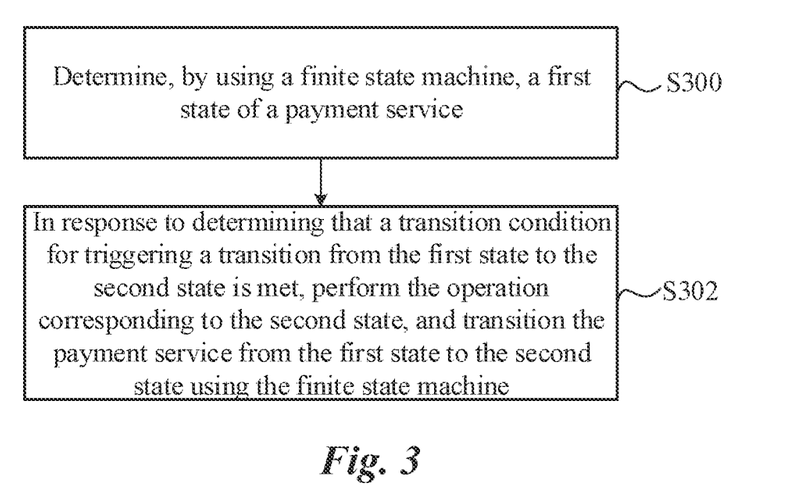
FIG. 3 is a flowchart illustrating a method for executing a payment process, according to an implementation of the present specification.

FIG. 3 is a flowchart illustrating a method for executing a payment process, according to an implementation of the present specification. The method includes the following steps:

S300: Determine, by using a finite state machine, a first state of a payment service.

S302: In response to determining that a transition condition for triggering a transition from the first state to the second state is met, perform the functional operation corresponding to the second state, and transition the payment service from the first state to the second state using the finite state machine.

The execution body of the method can be an electronic payment system, which can be specifically a server or a server cluster for processing electronic payment services.

It is worthwhile to note that in the method shown in FIG. 3, the finite state machine is pre-configured using the method for configuring a payment process shown in FIG. 2. Specifically, the state transition table that corresponds to the payment process and that is generated using the method shown in FIG. 2 can be written to the configuration file of the electronic payment system in advance, for the electronic payment system to retrieve the state transition table from the configuration file of the electronic payment system at a startup.

In this implementation of the present specification, the first state represents the current state of the payment service that is determined using the finite state machine, and the second state represents a state to which the payment service is subsequently transitioned from the first state. The first state and the second state can be the same state.

After detecting, from the state transition table, that the transition condition for triggering the transition from the first state to the second state is met, the electronic payment system can, on the one hand, perform the functional operation corresponding to the second state and, on the other hand, transition the payment service from the first state to the second state using the finite state machine.

Specifically, the state transition table can be queried; and in response to determining that a transition condition obtained from the state transition table is met, it is determined that a transition condition for triggering a transition from the first state to the second state is met.

Further, before querying the state transition table, the electronic payment system retrieves the state transition table from a configuration file of the electronic payment system at a startup; or the electronic payment system retrieves the state transition table from a cache of the electronic payment system at a runtime.

In addition, sometimes the electronic payment system can be a distributed system; that is, a plurality of electronic payment subsystems cooperate with each other to perform the payment process. In this case, the electronic payment subsystems need to invoke each other (either synchronously or asynchronously) to execute the payment process. In addition, to ensure that the data in the databases of all electronic payment subsystems is consistent, the work of each electronic payment subsystem is divided into a service acceptance stage and a service processing stage. At the service acceptance stage, the electronic payment subsystem guarantees the idempotent for the invocation requests received from other electronic payment subsystems (that is, a plurality of identical invocation requests that are repeatedly received are considered as one invocation request). If the electronic payment subsystem fails to handle the service at the service handling stage, the electronic payment subsystem cannot obtain the corresponding service data at the service processing stage.

The electronic payment subsystem not only accepts the invocation request successfully at the service acceptance stage, but also processes the accepted invocation request successfully at the service processing stage before performing state transition using the finite state machine. If the electronic payment subsystem fails to accept the invocation request at the service acceptance stage or fails to process the invocation request at the service processing stage, compensation and/or retry for the service acceptance or the service processing needs to be triggered, so that the electronic payment subsystem successfully accepts the invocation request at the service acceptance stage and successfully processes the invocation request at the service processing stage, thereby enabling the state transition to be performed by the finite state machine.

Figure 4:
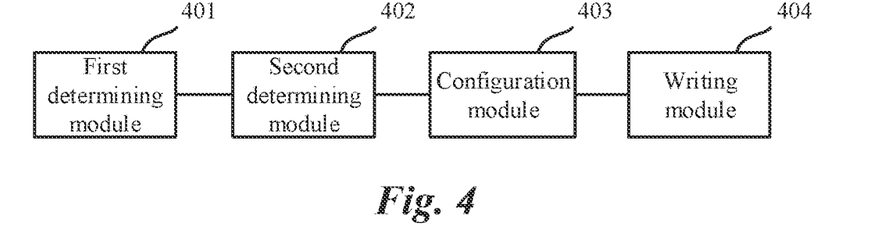
FIG. 4 is a flowchart illustrating an apparatus for configuring a payment process, according to an implementation of the present specification.

Based on the method for configuring a payment process shown in FIG. 2, an implementation of the present specification further provides an apparatus for configuring a payment process. As shown in FIG. 4, the apparatus includes: a first determining module 401, configured to determine, based on functional operations included in a predetermined payment process, states corresponding to the functional operations, respectively, where with respect to each functional operation, a state corresponding to the functional operation is a state of a payment service when the functional operation is performed; a second determining module 402, configured to determine a transition relationship between the states based on an association relationship between the functional operations included in the payment process, and determine a condition for transition between the states based on a trigger condition corresponding to each functional operation in the payment process; and a configuration module 403, configured to configure a finite state machine corresponding to the payment process based on the states, the transition relationship between the states, and the condition for transition between the states, so as to execute the payment process through the finite state machine.

The payment process specifically includes a process for paying medical expenses using one or more of a bank card and a medical insurance card.

The configuration module 403 generates a state transition table corresponding to the finite state machine based on the states, a transition relationship between the states, and a condition for transition between the states, for the electronic payment system to query the state transition table in executing the payment process.

The apparatus further includes a writing module 404, configured to: write the state transition table to a configuration file of the electronic payment system, for the electronic payment system to retrieve the state transition table from the configuration file of the electronic payment system at a startup; and/or write the state transition table into a cache of the electronic payment system, for the electronic payment system to retrieve the state transition table from the cache of the electronic payment system at a runtime.

Figure 5:
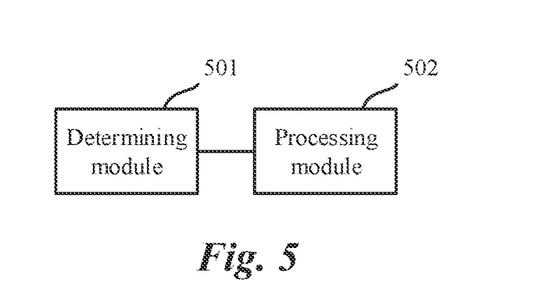
FIG. 5 is a flowchart illustrating an apparatus for executing a payment process, according to an implementation of the present specification.

Based on the method for executing a payment process shown in FIG. 3, an implementation of the present specification further provides an apparatus for configuring a payment process. As shown in FIG. 5, the apparatus includes: a determining module 501, configured to determine, by using a finite state machine, a first state of a payment service, the finite state machine being pre-configured using the method shown in FIG. 2; and a processing module 502, configured to: in response to determining that a transition condition for triggering a transition from the first state to the second state is met, perform the functional operation corresponding to the second state, and transition the payment service from the first state to the second state using the finite state machine.

The processing module 502 queries a state transition table; and in response to determining that a transition condition obtained from the state transition table is met, determines that the transition condition for triggering the transition from the first state to the second state is met.

The processing module 502 retrieves the state transition table from a configuration file of the device when the device is started before querying the state transition table; or retrieves the state transition table from a cache of the device when the device is running.

Figure 6:
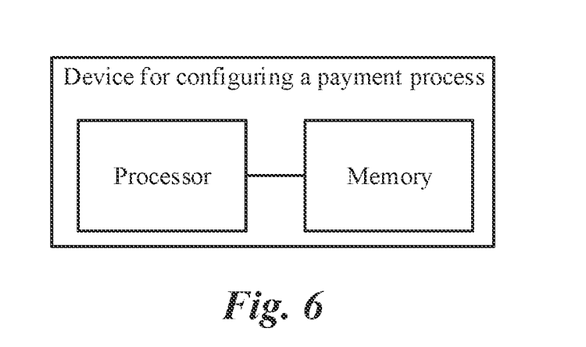
FIG. 6 is a flowchart illustrating a device for configuring a payment process, according to an implementation of the present specification.

Based on the method for configuring a payment process shown in FIG. 2, an implementation of the present specification further provides a device for configuring a payment process. As shown in FIG. 6, the device includes one or more processors and a memory, where the memory stores a program executable by the one or more processors to perform the following steps: determining, based on functional operations included in a predetermined payment process, states corresponding to the functional operations, respectively, where with respect to each functional operation, a state corresponding to the functional operation is a state of a payment service when the functional operation is performed; determining a transition relationship between the states based on an association relationship between the functional operations included in the payment process, and determining a condition for transition between the states based on a trigger condition corresponding to each functional operation in the payment process; and configuring a finite state machine corresponding to the payment process based on the states, the transition relationship between the states, and the condition for transition between the states, so as to execute the payment process through the finite state machine.

Figure 7:
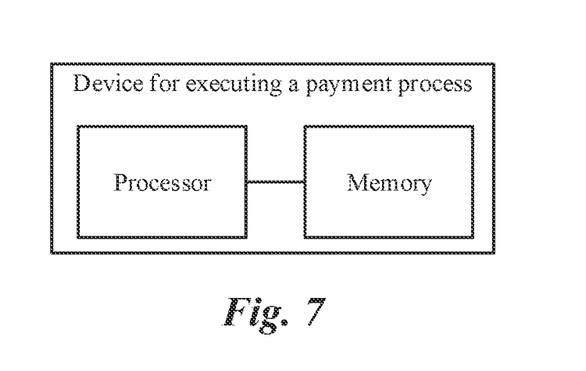
FIG. 7 is a flowchart illustrating a device for executing a payment process, according to an implementation of the present specification.

Based on the method for executing a payment process shown in FIG. 3, an implementation of the present specification further provides a device for executing a payment process. As shown in FIG. 7, the device includes one or more processors and a memory, where the memory stores a program executable by the one or more processors to perform the following steps: determining, by using a finite state machine, a first state of a payment service, the finite state machine being pre-configured using the method shown in FIG. 2; and in response to determining that a transition condition for triggering a transition from the first state to the second state is met, performing the functional operation corresponding to the second state, and transitioning the payment service from the first state to the second state using the finite state machine.

The implementations of the present specification are described in a progressive way. For same or similar parts of the implementations, mutual references can be made to the implementations. Each implementation focuses on a difference from the other implementations. Particularly, the device implementations shown in FIG. 6 and FIG. 7 are basically similar to the method implementations, and therefore are described briefly. For related parts, references can be made to related descriptions in the method implementations.

In the 1990s, whether technology improvement is hardware improvement (for example, improvement of a circuit structure, such as a diode, a transistor, or a switch) or software improvement (improvement of a method procedure) can be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed using the several described hardware description languages and is programmed into an integrated circuit.

A controller can be implemented using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented using a computer chip or an entity, or can be implemented using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Certainly, functions of the units can be implemented in the same or different software or hardware when the present specification is implemented.

A person skilled in the art should understand that the implementations of the present specification can be provided as methods, systems, or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification is described with reference to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of functional operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computer device. Based on the definition in the present specification, the computer readable medium does not include transitory media such as a modulated data signal and carrier.

It is also worthwhile to note that terms "include," "include" or any other variant is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The above descriptions are merely examples of the present specification and are not intended to limit the present specification. For a person skilled in the art, the present specification can be subject to various modifications and variations. Any modification, equivalent replacement, or improvement made without departing from the spirit and principle of the present specification shall fall within the scope of the claims.

What is claimed is:

1. A method for efficient programming and configuring a plurality of electronic payment processes including a first electronic payment process and a second electronic payment process, wherein the first electronic payment process includes a first logic flow of steps each corresponding to a functional operation and wherein the second electronic payment process includes a second logic flow of steps each corresponding to a functional operation, the method comprising:

receiving a plurality of programming language-based descriptions each describing a distinct functional operation of a plurality of functional operations usable to implement the first electronic payment process;

compiling each of the plurality of programming language-based description into a distinct computer-executable code segment of a plurality of computer-executable code segments, wherein the plurality of computer-executable code segments correspond to a plurality of states of a first finite state machine;

compiling at least another programming language-based description into at least one computer-executable code segment other than the plurality of computer-executable code segments to implement, in part, the second electronic payment process, wherein the at least one computer-executable code segment corresponds to a subset of states of the second finite state machine;

determining a plurality of transition relationships between states of the plurality of states of the first finite state machine based, at least in part, on the first logic flow of steps of the first electronic payment process;

generating a first state transition table based, at least in part, on the plurality of states of the first finite state machine and the transition relationship between the states;

generating a second state transition table based, at least in part, on the states of the second finite state machine and the second logic flow;

storing the first state transition table in a cache of a computer-based electronic payment system, the computer-based electronic system implementing the first finite state machine;

configuring the first finite state machine of the computer-based electronic payment system by retrieving the first state transition table from the cache at a runtime of the computer-based electronic payment system;

configuring the second finite state machine based, at least in part, on the second state transition table; and reusing a subset of the plurality of computer-executable code segments to implement, in part, the second electronic payment process based, at least in part, on the configured second finite state machine.

2. The method according to claim 1, wherein at least two steps of the first logic flow correspond to a same functional operation.

3. The method according to claim 1, wherein the plurality of programming language-based descriptions include at least source codes based on two different programming languages.

4. The method according to claim 3, wherein the source codes based on two different programming languages correspond to two different functional operations.

5. The method according to claim 1, further comprising receiving indication of conditions for transitioning between the states of the plurality of states of the first finite state machine, wherein the conditions include one or more results from executing the computer-executable code segment that corresponds to one of the plurality of states of the first finite state machine.

6. The method according to claim 5, wherein the first state transition table is generated based further on the conditions for transitioning between the states.

7. The method according to claim 1, further comprising executing the electronic payment process through the finite state machine by selectively executing one or more code segments of the plurality of code segments based on the state transition table.

8. A device, comprising one or more processors and a memory storing executable instructions executable by the one or more processors to perform acts comprising:

receiving a plurality of programming language-based descriptions each describing a distinct functional operation of a plurality of functional operations usable to implement a first electronic payment process;

compiling each of the plurality of programming language-based description into a distinct computer-executable code segment of a plurality of computer-executable code segments, wherein the plurality of computer-executable code segments correspond to a plurality of states of a first finite state machine;

compiling at least another programming language-based description into at least one computer-executable code segment other than the plurality of computer-executable code segments to implement, in part, the second electronic payment process, wherein the at least one computer-executable code segment corresponds to a subset of states of the second finite state machine;

determining a plurality of transition relationships between states of the plurality of states of the first finite state machine based, at least in part, on a first logic flow of steps of the first electronic payment process;

generating a first state transition table based, at least in part, on the plurality of states of the first finite state machine and the transition relationship between the states;

generating a second state transition table based, at least in part, on the states of the second finite state machine and a second logic flow of the second electronic payment process;

configuring the first finite state machine using the first state transition table at a runtime of an electronic payment system that implements the first electronic payment process;

configuring the second finite state machine based, at least in part, on the second state transition table; and reusing a subset of the plurality of computer-executable code segments to implement, in part, the second electronic payment process based, at least in part, on the configured second finite state machine.

9. The device according to claim 8, wherein at least two steps of the first logic flow correspond to a same functional operation.

10. The device according to claim 8, wherein the plurality of programming language-based descriptions include at least source codes based on two different programming languages.

11. The device according to claim 10, wherein the source codes based on two different programming languages correspond to two different functional operations.

12. The device according to claim 8, wherein the acts further comprise receiving indication of conditions for transitioning between the states of the plurality of states of the first finite state machine, wherein the conditions include one or more results from executing the computer-executable code segment that corresponds to one of the plurality of states of the first finite state machine.

13. The device according to claim 12, wherein the first state transition table is generated based further on the conditions for transitioning between the states.

14. A non-transitory computer-readable storage medium storing contents that, when executed by one or more processors, cause the one or more processors to perform acts comprising:

receiving a plurality of programming language-based descriptions each describing a distinct functional operation of a plurality of functional operations usable to implement a first electronic payment process;

compiling each of the plurality of programming language-based description into a distinct computer-executable code segment of a plurality of computer-executable code segments, wherein the plurality of computer-executable code segments correspond to a plurality of states of a first finite state machine;

compiling at least another programming language-based description into at least one computer-executable code segment other than the plurality of computer-executable code segments to implement, in part, the second electronic payment process, wherein the at least one code segment corresponds to a subset of states of the second finite state machine;

determining a plurality of transition relationships between states of the plurality of states of the first finite state machine based, at least in part, on a first logic flow of steps of the first electronic payment process;

generating a first state transition table based, at least in part, on the plurality of states of the first finite state machine and the transition relationship between the states;

generating a second state transition table based, at least in part, on the states of the second finite state machine and a second logic flow of the second electronic payment process;

configuring the first finite state machine using the first state transition table at a runtime of an electronic payment system that implements the first electronic payment process; and configuring the second finite state machine based, at least in part, on the second state transition table; and reusing a subset of the plurality of computer-executable code segments to implement, in part, the second electronic payment process based, at least in part, on the configured second finite state machine.

15. The storage medium according to claim 14, wherein at least two steps of the first logic flow correspond to a same functional operation.

16. The storage medium according to claim 14, wherein the plurality of programming language-based descriptions include at least source codes based on two different programming languages.

17. The storage medium according to claim 16, wherein the source codes based on two different programming languages correspond to two different functional operations.

18. The storage medium according to claim 14, wherein the acts further comprise receiving indication of conditions for transitioning between the states of the plurality of states of the first finite state machine, wherein the conditions include one or more results from executing the computer-executable code segment that corresponds to one of the plurality of states of the first finite state machine.

19. The storage medium according to claim 18, wherein the first state transition table is generated based further on the conditions for transitioning between the states.

20. The storage medium according to claim 14, wherein the acts further comprise causing selective execution of one or more code segments of the plurality of code segments based on the state transition table to implement the electronic payment process through the finite state machine.

* * * * *